United States Patent Office 3,193,564
Patented July 6, 1965

3,193,564
17α-(ARALKYL)ESTRA - 1,3,5(10) - TRIENE-3,17β-DI-
OLS, INTERMEDIATES THERETO, AND ESTERS
CORRESPONDING
Raymond E. Counsell, Skokie, and Paul D. Klimstra,
Northbrook, Ill., assignors to G. D. Searle & Co., Chi-
cago, Ill., a corporation of Delaware
No Drawing. Filed Jan. 27, 1964, Ser. No. 340,488
15 Claims. (Cl. 260—397.5)

The present invention is concerned with novel steroid derivatives characterized by a 17α-aralkyl substituent and, more particularly, with 17α-(aralkyl)estra - 1,3,5(10)-triene-3,17β-diols and the corresponding lower alkanoyl esters, which substances can be represented by the following structural formula

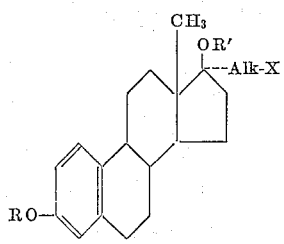

wherein R and R' can be either hydrogen or a lower alkanoyl radical, Alk is a lower alkylene radical, and X is an optionally fluorinated phenyl radical.

Examples of the lower alkanoyl radicals designated by R and R' are acetyl, propionyl, butyryl, valeryl, caproyl, and the branched-chain groups isomeric therewith. The lower alkylene radicals indicated by Alk in the foregoing representation are methylene, ethylene, trimethylene, tetramethylene, pentamethylene, and the corresponding branched-chain isomers.

The compounds of the present invention are conveniently produced by utilizing as starting materials 3-hydroxyestra-1,3,5(10)-trien-17-one or the corresponding 3-(lower alkanoyl) esters. Reaction of those substances with an aralkyl organometallic reagent followed by hydrolysis of the resulting adduct results in the instant 17α-aralkyl-estra-1,3,5(10)-triene-3,17β-diols. A specific example of that process is the reaction of 3-hydroxyestra-1,3,5(10)-trien-17-one with p-fluorobenzyl magnesium chloride in ether solution followed by hydroylsis with aqueous ammonium chloride to afford 17α-(p-fluorobenzyl)-estra-1,3,5(10)-triene-3,17β-diol.

An alternate route to the 17α-aralkyl compounds of this invention, containing more than one carbon atom in the alkyl chain, proceeds by way of the 17α-aralkynyl and 17α-aralkenyl intermediates of the structural formula

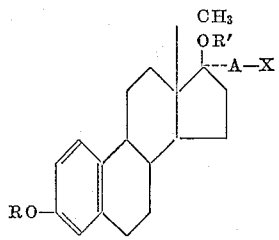

wherein R, R', and X are as hereinbefore defined, and A is a lower alkynylene or lower alkenylene radical. Specific radicals envisaged are ethynylene and vinylene. These intermediates can be obtained also by utilizing 3-hydroxyestra-1,3,5(10)-trien-17-one or the corresponding 3-(lower alkanoyl) esters as starting materials. The reaction of 3-hydroxyestra-1,3,5(10)-trien-17-one, for example, with sodium phenylacetylide, prepared from phenylacetylene and sodium, in tetrahydrofuran soultion results in 17α-phenylalkynylestra-1,3,5(10)-triene-3,17β - diol. Partial catalytic hydrogenation of those 17α-aralkynyl intermediates affords the 17α-aralkenyl derivatives which can be hydrogenated further to yield the instant 17α-aralkyl substances. Typically, the aforementioned 17α-phenylalkynylestra-1,3,5(10)-triene-3,17β-diol is shaken with hydrogen and 5% palladium-on-carbon catalyst in pyridine solution to produce 17α-phenylvinylestra-1,3,5(10)-triene-3,17β-diol. Hydrogenation of the latter substance with that catalyst in ethanol solution results in the instant 17α-phenethylestra-1,3,5(10)-triene-3,17β-diol. Alternatively, 17α-phenylalkynylestra-1,3,5(10)-triene-3,17β-diol can be hydrogenated directly to 17α-phenethylestra - 1,3,5(10)-triene-3,17β-diol by conducting the process in ethanol solution until two molecular equivalents of hydrogen are consumed.

The instant lower alkanoyl esters can be produced by reaction of the corresponding diols with an appropriate acylating agent such as a lower alkanoic acid or alkanoyl halide, preferably in the presence of a suitable acid acceptor, or alternatively, in the case of those derivatives possessing an alkyl chain of more than one carbon atom, by reduction of the corresponding 17α-aralkynyl or 17α-aralkenyl intermediates. The 3,17-bis-(lower alkanoates) are obtained also by acylation with the appropriate isopropenyl ester in the presence of an acidic catalyst such as p-toluenesulfonic acid. Thus, 17α-phenethylestra-1,3,5(10)-triene-3,17β-diol 3,17-diacetate can be obtained by acylation of the corresponding 3,17β-diol, either by reaction with acetic anhydride and pyridine at the reflux temperature or with isopropenyl acetate in the presence of p-toluenesulfonic acid at the reflux temperature, or by catalytic reduction of 17α-phenylvinylestra-1,3,5(10)-triene-3,17β-diol 3,17-diacetate, which is produced by catalytic hydrogenation of 17α-phenylethynylestra-1,3,5(10) - triene-3,17β-diol 3,17 - diacetate. The 17α-phenylalkynyl 3,17-bis-(lower alkanoates) are produced from the corresponding diols, preferably by reaction with a lower alkanoic acid anhydride such as acetic anhydride in the presence of a suitable acid acceptor such as pyridine. When these acylation reactions are conducted at room temperature, the 3-(lower alkanoates) are produced. As a specific illustration, 17α-(p-fluorobenzyl)-estra-1,3,5(10)-triene-3,17β-diol is contacted with acetic anhydride in pyridine at room temperature for about 16 hours to yield 17α-(p-fluorobenzyl) estra-1,3,5(10)-triene-3,17β-diol 3-acetate.

The 17α-aralkyl compounds of the present invention are useful in view of their valuable pharmacological properties. They are potent hypocholesterolemic agents, for example, which possess the particular advantage of displaying only minimal estrogenic activity. In addition, they exhibit anti-estrogenic and anti-fertility properties. These compounds are useful also as inhibitors of monocotyledenous seed germination.

The invention will appear in further detail from a consideration of the following examples. These examples are given for the purpose of illustration only and are not to be construed as limiting the invention either in spirit or in scope. In these examples, temperatures are given in degrees centigrade (° C.) and materials in parts by weight unless otherwise noted.

Example 1

To a mixture of 9 parts of metallic sodium, cut into small pieces, with 148 parts of tetrahydrofuran, is added dropwise with stirring 56 parts of phenylacetylene over a period of about 1½ hours. The resulting mixture is heated at the reflux temperature for about 1½ hours, after which time a solution of 30 parts of 3-hydroxyestra-1,3,5(10)-trien-17-one in 337 parts of hot tetrahydrofuran is added over a period of about 20 minutes. That reaction mixture is heated at the reflux temperature for about 16 hours, then is cooled and is diluted with approximately 20 parts of water in order to destroy the unreacted sodium phenylacetylide. That mixture is poured into approximately 2000 parts of a mixture of ice and water containing 60 parts of concentrated hydrochloric acid, and the resulting acidic solution is extracted several times with ether. The organic layer is separated, washed successively with water and dilute aqueous sodium bicarbonate, then dried by means of a mixture of anhydrous potassium carbonate and activated carbon. Removal of the solvent by distillation at reduced pressure affords a dark oily residue which solidifies on standing. Recrystallization of that crude product from benzene followed by washing with hexane yields 17α-phenylethynylestra-1,3,5(10)-triene-3,17β-diol, melting at about 156–158°. It can be represented by the following structural formula

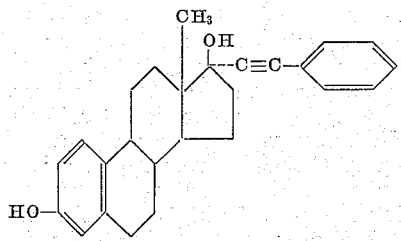

Example 2

To a solution of 8 parts of 17α-phenylethynylestra-1,3,5(10)-triene-3,17β-diol in 320 parts of ethanol is added 0.8 part of 5% palladium-on-carbon catalyst, and the resulting mixture is shaken with hydrogen at atmospheric pressure and room temperature until two molecular equivalents of hydrogen are absorbed. Removal of the catalyst by filtration affords a filtrate, which is poured into a mixture of ice and water, and the resulting aqueous mixture is extracted several times with chloroform. The chloroform layer is separated, washed with water, dried over anhydrous potassium carbonate, and stripped of solvent at reduced pressure. The residual glass-like crude product is recrystallized from acetone-hexane to afford pure 17α-phenethylestra-1,3,5(10)-triene-3,17β-diol, melting at about 137–138°. It exhibits an optical rotation of +44.5° in chloroform and is characterized further by the following structural formula

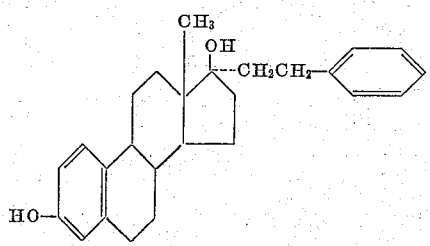

Example 3

To a mixture of 24.3 parts of magnesium with 175 parts of ether, in a nitrogen atmosphere, is added dropwise with stirring, over a period of about one hour, a solution of 126.5 parts of benzyl chloride in 175 parts of ether. At that rate of addition, the temperature of the mixture is maintained at the reflux point. Refluxing is continued for about 2½ hours longer, after which time a solution of 45 parts of 3-hydroxyestra-1,3,5(10)-trien-17-one in 675 parts of hot tetrahydrofuran is added rapidly over a period of about 30 minutes. Stirring and heating is continued at the reflux temperature for 16 hours; then a solution of 45 parts of ammonium chloride in 250 parts of water is added dropwise with cooling. The organic layer is separated from the precipitated inorganic salts by decantation, and the salts are then mixed with 25 parts of anhydrous sodium sulfate and 90 parts of tetrahydrofuran. That mixture is filtered, and the filtrate is combined with the original organic layer. Distillation of the combined solutions at reduced pressure to remove the solvent affords a semi-solid residue. Recrystallization of that residue from acetone-hexane affords pure 17α-benzylestra-1,3,5(10)-triene-3,17β-diol, melting at about 214.5–216.5°. It exhibits also an ultraviolet absorption maximum at about 281 millimicrons with a molecular extinction coefficient of about 2000. This substance is characterized also by the following structural formula

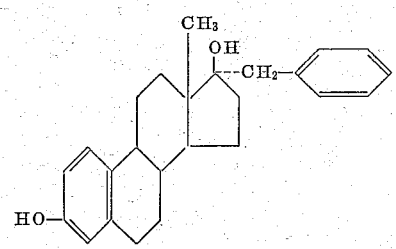

Example 4

To a mixture of 16 parts of magnesium in 140 parts of ether, in a nitrogen atmosphere, is added a solution of 84 parts of p-fluorobenzyl chloride in 91 parts of ether at such a rate that the mixture is maintained at the reflux temperature. Heating under reflux is continued for about 2 hours longer, after which time a solution of 30 parts of 3-hydroxyestra-1,3,5(10)-trien-17-one in 450 parts of hot tetrahydrofuran is added dropwise over a period of about 20 minutes. The resulting reaction mixture is heated at the reflux temperature for about 16 hours, after which time 160 parts of water and 30 parts of ammonium chloride are added to the cooled solution. The organic layer is separated by decantation, and the residue is mixed with 25 parts of anhydrous sodium sulfate and 90 parts of tetrahydrofuran. The organic layer is again separated and combined with the original organic solution, and the combined solutions are stripped of solvent at reduced pressure to afford a white solid residue. Recrystallization of that crude product from acetone-hexane followed by washing of the recrystallized material with hexane results in 17α-(p-fluorobenzyl)estra-1,3,5(10)-triene-3,17β-diol, which displays a melting point at about 196–199° and an ultraviolet absorption maximum at about 272 millimicrons with a molecular extinction coefficient of about 2130. It is characterized further by the following structural formula

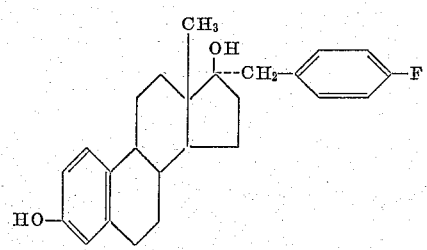

Example 5

A mixture of 9 parts of 17α-phenylethynylestra-1,3,5(10)-triene-3,17β-diol, 200 parts of pyridine, and 0.9 part of 5% palladium-on-carbon catalyst is shaken in a hydrogen atmosphere at atmospheric pressure and room temperature until one molecular equivalent of hydrogen is absorbed. The catalyst is removed by filtration, and the filtrate is diluted with a large quantity of water, then extracted with ether. The ether layer is separated, washed successively with dilute hydrochloric acid and dilute aqueous sodium bicarbonate, then dried over anhydrous potassium carbonate containing decolorizing carbon. Removal of the solvent by distillation at reduced pressure affords a dark yellow oily residue which is dissolved in a 1:9 ethyl acetate-benzene mixture, chromatographed on a silica gel column, and eluted with 1:9 ethyl acetate-benzene. That eluate is evaporated to dryness to afford a residue which is recrystallized from acetone-hexane, thus producing 17α-phenylvinylestra-1,3,5(10)-triene-3,17β - diol, melting at about 143–145°. It displays an optical rotation of +85° in chloroform and is characterized further by the following structural formula

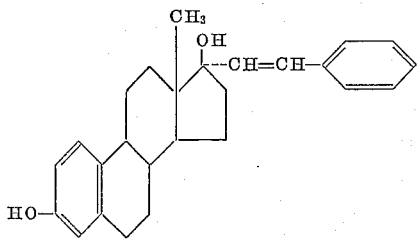

*Example 6*

A mixture of 2 parts of 17α-phenylvinylestra-1,3,5(10)-triene-3,17β-diol, 40 parts of ethanol, and 0.2 part of 5% palladium-on-carbon catalyst is shaken with hydrogen at atmospheric pressure and room temperature for about 2 hours, during which time one molecular weight of hydrogen is absorbed. Removal of the catalyst by filtration affords a solution which is poured carefully into ice-cold water. The resulting precipitate is collected by filtration, washed with water and dried in air. Recrystallization from acetone-hexane affords pure 17α-phenethylestra-1,3,5(10)-triene-3,17β-diol, identical with the product of Example 2.

*Example 7*

A mixture of 5 parts of 17α-(p-fluorobenzyl)-estra-1,3,5(10)-triene-3,17β-diol, 23 parts of acetic anhydride, and 45 parts of pyridine is allowed to stand at room temperature for about 16 hours, then is poured carefully into approximately 300 parts of water. The precipitate which forms is collected by filtration, washed on the filter with water, and dried in air to afford crude 17α-(p-fluorobenzyl)estra-1,3,5(10)-triene-3,17β-diol 3 - acetate. Recrystallization of that material from acetone-hexane yields the pure substance, which displays a melting point at about 178–180° and also an optical rotation of +43.5° in chloroform. This substance is represented by the structural formula

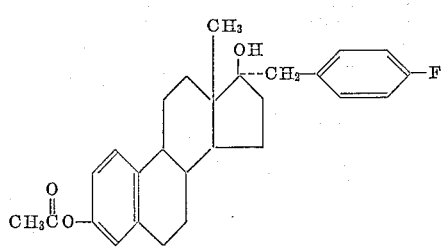

*Example 8*

To a solution of 10 parts of 17α-benzylestra-1,3,5(10)-triene-3,17β-diol in 184 parts of isopropenyl acetate is added 1.5 parts of p-toluenesulfonic acid monohydrate, and the resulting reaction mixture is heated at the reflux temperature with concomitant removal of the volatile distillation products over a period of about 6 hours. The reaction mixture is then allowed to cool, and the precipitate which forms is collected by filtration, then dried to afford the crude product. Recrystallization from aqueous dioxane affords pure 17α-benzylestra-1,3,5(10)-triene-3,17β-diol 3,17-diacetate, melting at about 180.5–183° and characterized also by an optical rotation of +54.5°.

An additional quantity of this diacetate is obtained from the original filtrate by dilution of that solution with ether followed by successive washings with water, dilute aqueous sodium carbonate, and water, drying over anhydrous sodium sulfate containing decolorizing carbon, stripping of the solvent at reduced pressure, and trituration of the resulting residue with methanol.

The product of this example is characterized further by the following structural formula

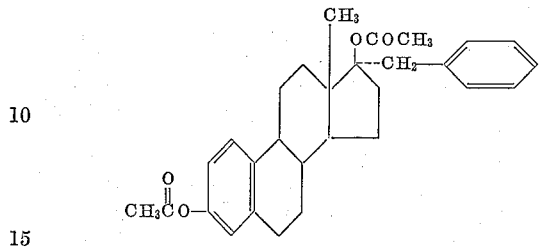

*Example 9*

A solution containing 5 parts of 17α-benzylestra-1,3,5(10)-triene-3,17β-diol, 23 parts of acetic anhydride and 45 parts of pyridine is stored at room temperature for about 16 hours, then is poured into a large quantity of water. The semi-solid product which forms is collected by filtration, then is dissolved in approximately 56 parts of methanol. That organic solution is then diluted with a mixture of 500 parts of ice and water, and the precipitate which separates is collected by filtration, washed with water, and dried in air. Recrystallization of that crude product from acetone affords 17α-benzylestra-1,3,5(10)-triene-3,17β-diol 3-acetate, melting at about 146–147.5°. It displays an optical rotation of +46° in chloroform and is further characterized by the following structural formula

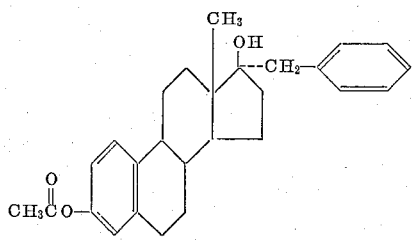

*Example 10*

A mixture of 2.8 parts of 17α-phenylvinylestra-1,3,5(10)-triene-3,17β-diol, 14 parts of acetic anhydride, and 28 parts of pyridine is stored at room temperature for about 16 hours, then is poured into water. The resulting aqueous mixture is extracted with ether, and the organic layer is separated, washed successively with dilute hydrochloric acid and dilute aqueous sodium bicarbonate, then dried over anhydrous potassium carbonate containing decolorizing carbon. Removal of the solvent by distillation at reduced pressure affords the crude product which is purified by recrystallization from ethyl acetate-hexane to produce 17α-phenylvinylestra-1,3,5(10)-triene-3,17β-diol 3-acetate hemihydrate. This substance is charatcerized by an optical rotation of +50° in choloform and also by the following structural formula

*Example 11*

A mixture of one part of 17α-phenylvinylestra-1,3,5(10)-triene-3,17β-diol 3-acetate, 20 parts of ethanol, and 0.1 part of 5% palladium-on-carbon catalyst is shaken in a hydrogen atmosphere at room temperature and atmospheric pressure until one molecular equivalent of hydrogen is absorbed. Removal of the catalyst by filtration affords a solution which is poured carefully into a mixture of ice and water. That aqueous mixture is extracted with ether, and the ether layer is separated, washed successively with dilute hydrochloric acid and dilute aqueous sodium bicarbonate, then dried over anhydrous sodium sulfate containing decolorizing carbon. The solvent is removed by distillation at reduced pressure to afford a residual oily crude product. Recrystallization of that material from acetone-hexane results in 17α-phenethylestra-1,3,5(10)-triene-3,17β-diol 3-acetate, which substance is characterized by infrared absorption maxima at about 2.75, 3.41, 5.76, 6.23, 6.5, and 7.92 microns. Its structure is illustrated by the following formula

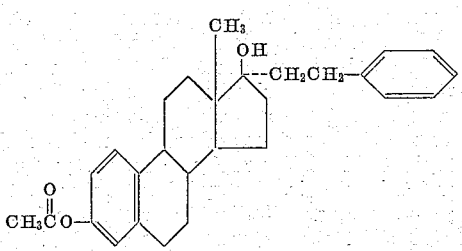

*Example 12*

A mixture of one part of 17α-phenylethynylestra-1,3,5(10)-triene-3,17β-diol, 5 parts of acetic anhydride, and 10 parts of pyridine is heated at the reflux temperature with stirring for about 6 hours. The reaction mixture is then cooled and poured into a mixture of ice and water. Extraction with ether affords an organic solution which is washed successively with water, dilute hydrochloric acid and dilute aqueous sodium bicarbonate, then is dried over anhydrous sodium sulfate containing decolorizing carbon. Removal of the solvent by distillation at reduced pressure affords an oily residue which is dissolved in benzene and adsorbed on a silica gel chromatographic column. Elution of that column with 10–11% ethyl acetate in benzene mixtures affords a fraction which is recrystallized from aqueous methanol to yield 17α-phenylethynylestra-1,3,5(10)-triene-3,17β-diol 3,17-diacetate. That substance displays infrared absorption maxima at about 3.41, 5.76, 6.28, 6.54, and 7.95 microns and is further characterized by the following structural formula

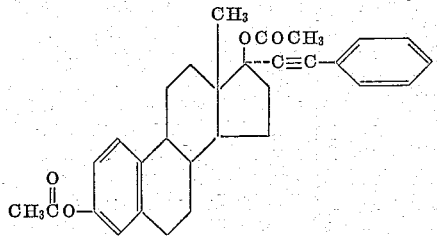

*Example 13*

To a solution of 17α-phenylethynylestra-1,3,5(10)-triene-3,17β-diol 3,17-diacetate in 25 parts of pyridine is added 0.1 part of 5% palladium-on-carbon catalyst, and that reaction mixture is shaken with hydrogen at atmospheric pressure and room temperature until one molecular equivalent of hydrogen is absorbed. The catalyst is removed by filtration, and the filtrate is poured into water, then extracted with ether. The organic layer is separated, washed successively with dilute hydrochloric acid and dilute aqueous sodium bicarbonate, then dried over anhydrous potassium carbonate containing decolorizing carbon. The solvent is removed by distillation at reduced pressure, and the residual oily product is dissolved in benzene, then is chromatographed on a silica gel column. Elution of that column with 5% ethyl acetate in benzene affords a fraction which is purified by recrystallization from acetone-hexane to yield 17α-phenylvinylestra-1,3,5(10)-triene-3,17β-diol 3,17-diacetate, characterized by infrared absorption maxima at about 3.4, 5.76, 6.01, 6.28, 6.56, and 7.92 microns. It can be represented by the following structural formula

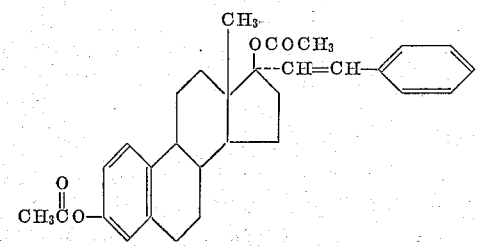

*Example 14*

The reaction of 2.8 parts of 17α-phenylethynylestra-1,3,5(10)-triene-3,17β-diol with 21.3 parts of butyric anhydride according to the procedure described in Example 10 results in 17α-phenylethynylestra-1,3,5(10)-triene-3,17β-diol 3-butyrate, which can be represented by the following structural formula

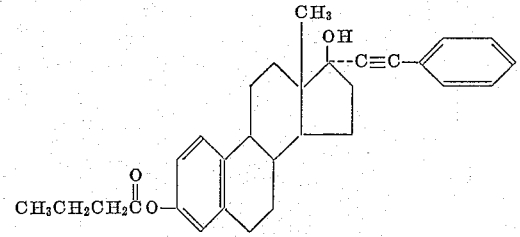

*Example 15*

By substituting 7.7 parts of butyric anhydride and otherwise proceeding according to the processes described in Example 12, 17α-phenylethynylestra-1,3,5(10)-triene-3,17β-diol 3,17-dibutyrate is obtained. This compound can be represented by the following structural formula

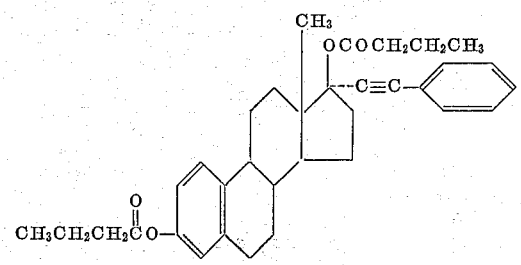

*Example 16*

The substitution of 235 parts of isopropenyl butyrate in the procedure of Example 8 results in 17α-benzylestra-1,3,5(10)-triene-3,17β-diol, 3,17-dibutyrate, which is represented by the following structural formula

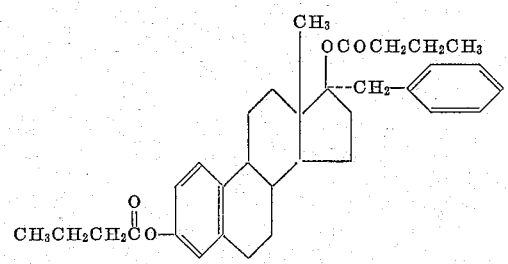

Example 17

The reaction of 5 parts of 17α-benzylestra-1,3,5(10)-triene-3,17β-diol with 35.6 parts of butyric anhydride and 45 parts of pyridine according to the procedure described in Example 9 results in 17α-benzylestra-1,3,5(10)-triene-3,17β-diol 3-butyrate of the structural formula

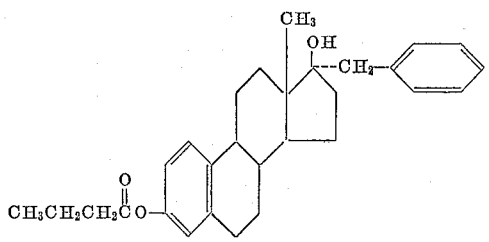

What is claimed is:
1. A member selected from the class consisting of compounds of the formula

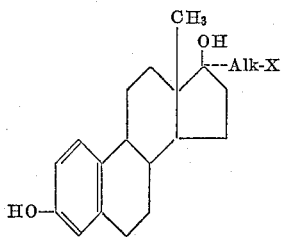

and the 3-17-bis-(lower alkanoates) and 3-mono-(lower alkanoates) thereof, wherein Alk is lower alkylene, and X is selected from the group of radicals consisting of phenyl and p-fluorophenyl.
2. 17α - (p-fluorobenzyl)estra-1,3,5(10)-triene-3,17β-diol.
3. 17α-(p-fluorobenzyl)estra-1,3,5(10) - triene - 3,17β-diol 3-acetate.
4. A compound of the formula

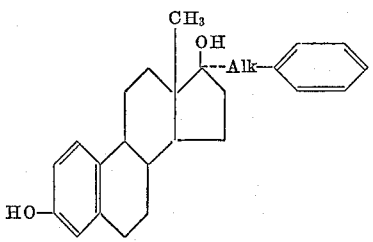

wherein Alk is lower alkylene.
5. 17α-benzylestra-1,3,5(10)-triene-3,17β-diol.
6. 17α-phenethylestra-1,3,5(10)-triene-3,17β-diol.

7. A compound of the formula

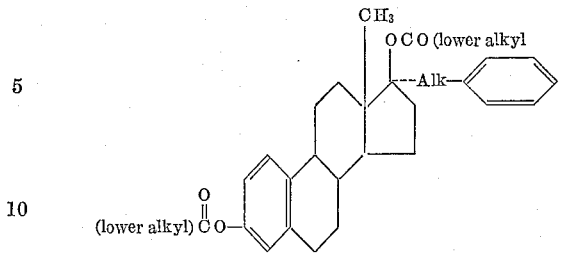

wherein Alk is lower alkylene.
8. 17α-benzylestra-1,3,5(10) - triene - 3,17β-diol 3,17-diacetate.
9. A compound of the formula

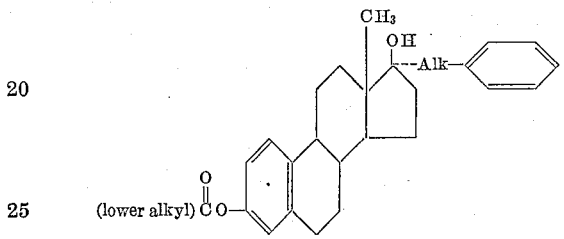

wherein Alk is lower alkylene.
10. 17α-benzylestra-1,3,5(10)-triene - 3,17β - diol 3-acetate.
11. A member selected from the group consisting of compounds of the formula

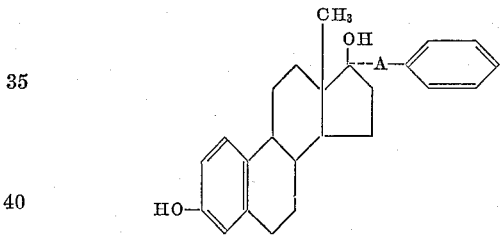

and the 3,17-bis-(lower alkanoates) and 3-mono-(lower alkanoates) thereof, wherein A is a radical selected from the class consisting of ethynylene and vinylene.
12. 17α-phenylethynylestra - 1,3,5(10) - triene - 3,17β-diol.
13. 17α-phenylvinylestra-1,3,5(10)-triene-3,17β-diol.
14. 17α-phenylethynylestra-1,3,5(10) - triene - 3,17β-diol 3-acetate.
15. 17α-phenylethynylestra-1,3,5(10) - triene - 3,17β-diol 3,17-diacetate.

References Cited by the Examiner
UNITED STATES PATENTS
2,280,236   4/21   Inhoffen et al. _____ 260—397.4

OTHER REFERENCES
Dvolaitzky et al.: "Societe Chimique de France," January 1963, pp. 62–71.

LEWIS, GOTTS, *Primary Examiner.*